Sept. 4, 1962 S. R. CLAVÉ 3,052,151
DEVICES FOR PROTECTION AGAINST IONIZING RADIATION AND
CONTAMINATION BY HARMFUL DUSTS, FOR APPARATUS FOR
OBSERVING THE INTERIOR OF SEALED CHAMBERS
Filed Nov. 4, 1958 4 Sheets-Sheet 3
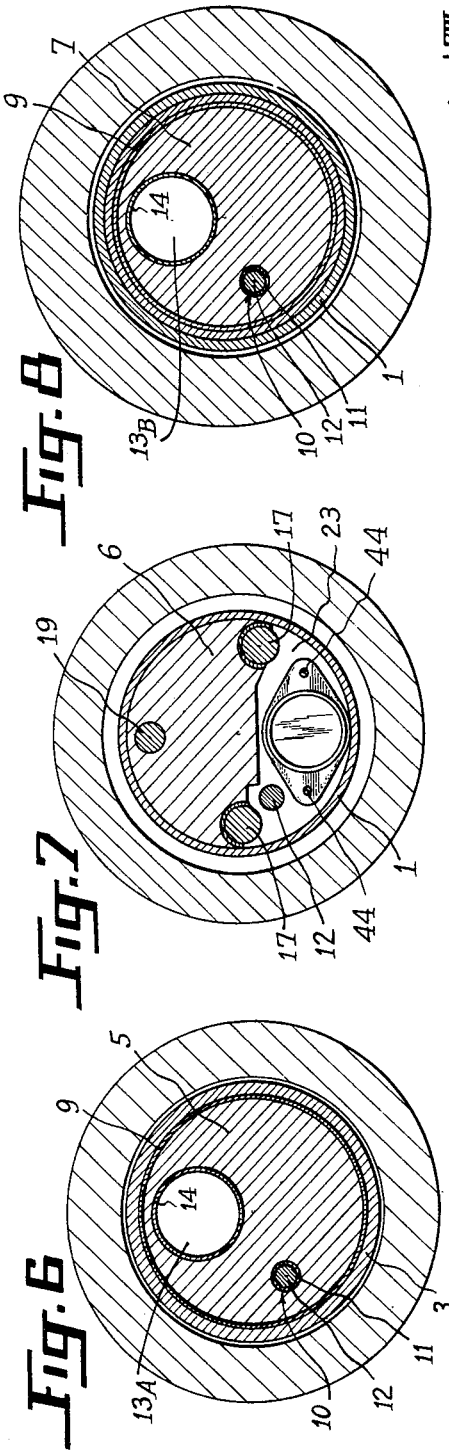
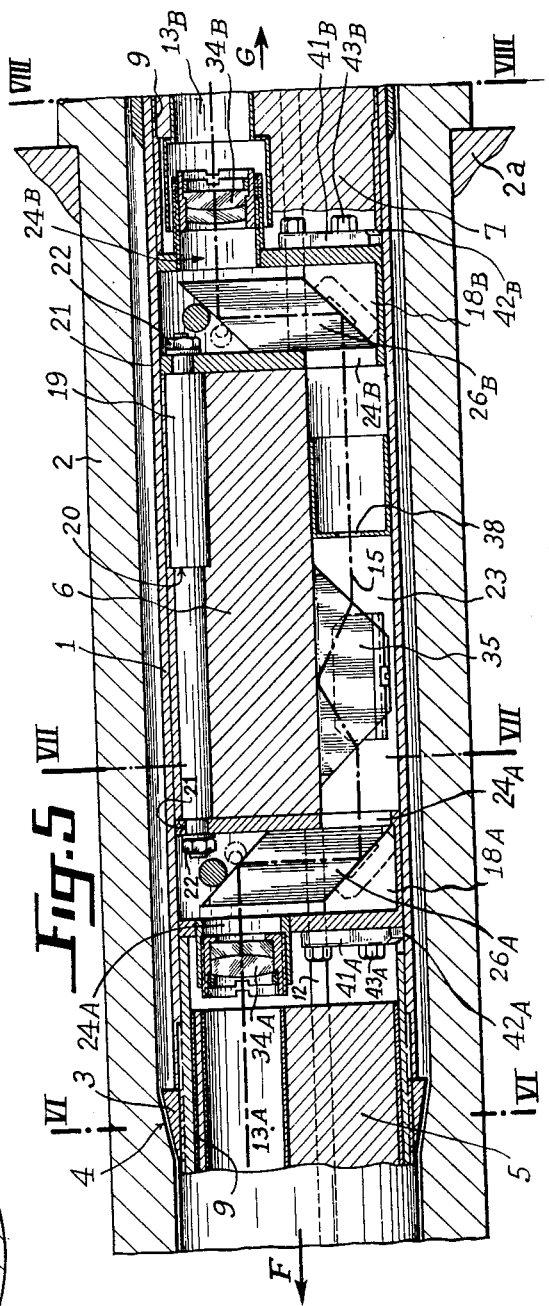
INVENTOR,
SERGE RENE CLAVE
BY Bacon & Thomas
ATTORNEYS

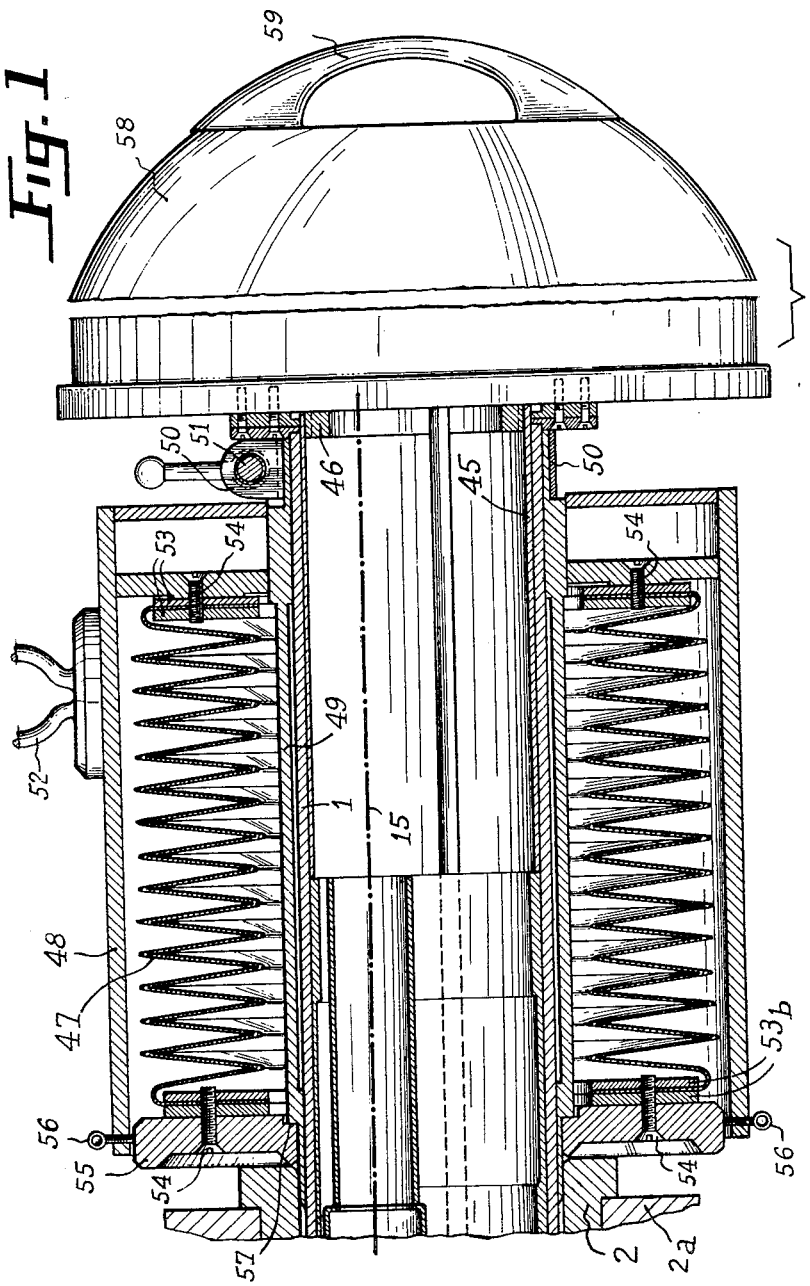

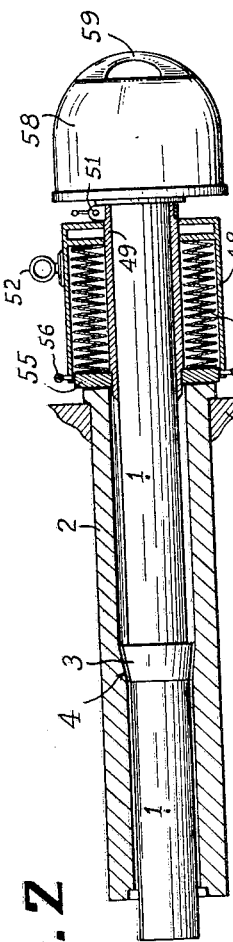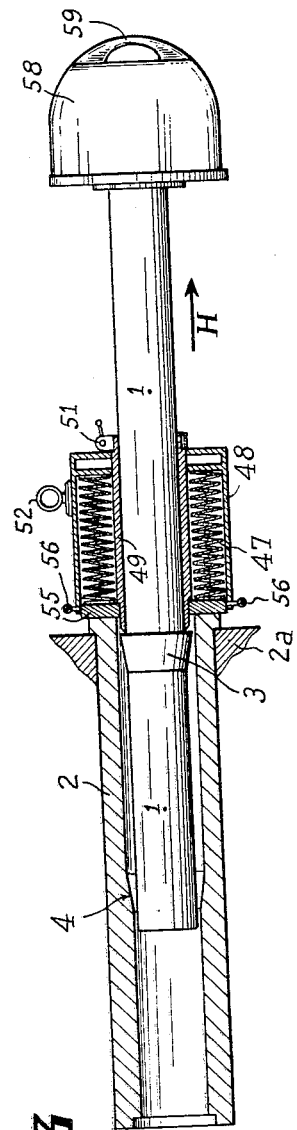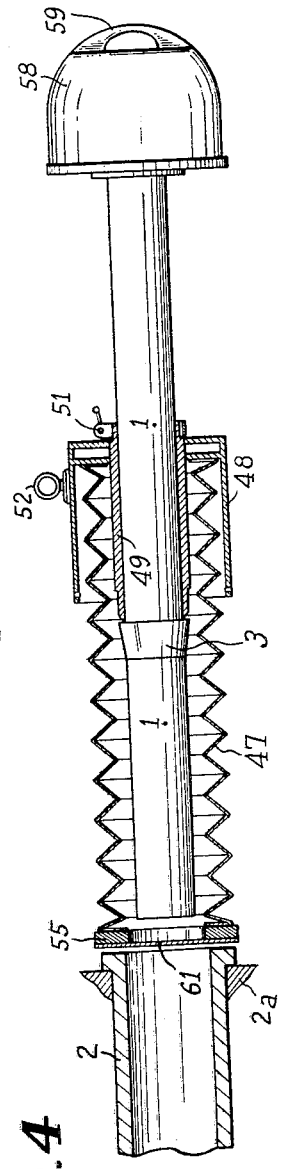

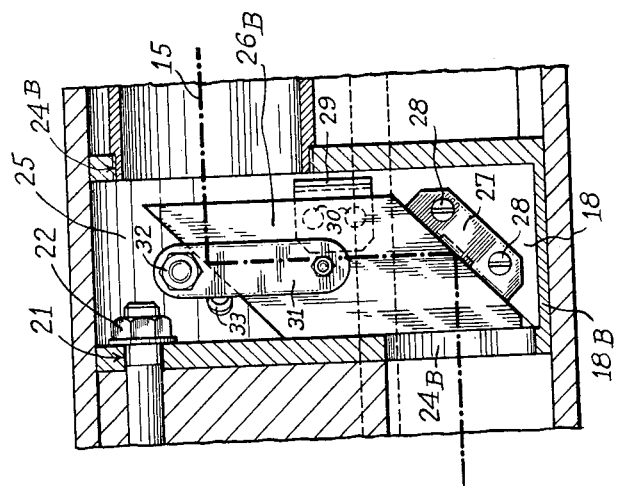
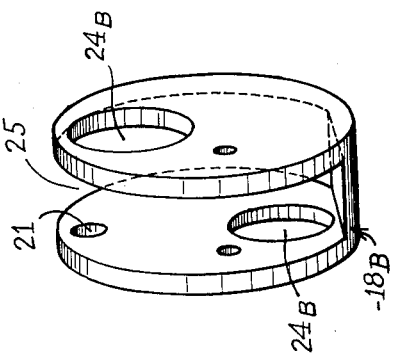

United States Patent Office 3,052,151
Patented Sept. 4, 1962

3,052,151
DEVICES FOR PROTECTION AGAINST IONIZING RADIATION AND CONTAMINATION BY HARMFUL DUSTS, FOR APPARATUS FOR OBSERVING THE INTERIOR OF SEALED CHAMBERS
Serge René Clavé, Paris, France, assignor to Commissariat a l'Energie Atomique, Paris, France
Filed Nov. 4, 1958, Ser. No. 771,852
5 Claims. (Cl. 88—1)

Optical apparatus of the present type is used for observing the interior of chambers containing radioactive elements. Such apparatus is mounted in the openings of the walls of these chambers and is adapted to provide continuity in protection against ionizing radiations.

The use of observation apparatus employing standard optical systems with a wide field presents the following disadvantages:

Some or all of the ionizing radiation enters the visual organs of the observer directly.

The withdrawal of the apparatus for maintenance and repair causes contamination of the environment outside the chamber by active dust contained therein and, more particularly, by dust deposited on the part of the apparatus which was previously inside the chamber.

The present invention relates to means for protection against ionizing radiations and contamination by harmful dusts for use with apparatus for observing the inside of sealed chambers, which means eliminate the above-mentioned disadvantages.

For this purpose, an optical apparatus according to the invention is mounted inside a cylindrical enevelope accommodated in an opening in a chamber and is characterized, in that the said envelope is surrounded by coaxial sealed cylindrical bellows connected at one end to a part of the observation apparatus outside the chamber, which bellows expands, when the observation apparatus is withdrawn from the chamber, and surrounds the part of the apparatus which was previously inside the chamber, the other end of the bellows being then closed by a sealing means.

According to a second essential characteristic of the invention, an apparatus of this kind comprises, inside the cylindrical envelope in which the apparatus is mounted, at least two cylindrical lead screens, each having non-aligned openings for the passage of light rays, between which screens there is arranged a prism with two inverted total reflections ensuring the transmission of the light rays from the opening of one screen to the opening of the next screen.

The advantages of the protective means designed in accordance with the invention is that these means make it possible to construct an easily manipulable optical apparatus which by standard means ensures good visibility of the inside of the chamber without increase in bulk due to the means for protection against radiation. Another advantage resides in the ease with which the apparatus can be set in place; this is done by introducing the apparatus directly into the wall, without complicated apertures such as those that are necessary in order to produce baffles directly outside the chamber for preventing the radiation from escaping; in particular, it is possible to put this apparatus in place after the construction of the chamber and of the equipment which the chamber contains.

The optical structure of the apparatus provided with the present protective means is of standard type. For instance, we shall describe hereunder an observation apparatus which is of the same kind as the azimuth-type periscopes commonly used by submarines for non-simultaneous observation of the horizon line and the sky. Such apparatus offers the particular advantage of having a wider field than that of the glass bricks set in the wall of the chamber, which are sometimes used.

The invention will be clearly understood in all its aspects with the aid of the following description:

Reference will be made to the accompanying drawings which show only those members which are necessary to enable the invention to be understood. Corresponding elements in the different figures of the drawings are designated by the same reference symbols.

In these drawings:

FIG. 1 is a longitudinal section through the part of an observation apparatus provided with means for protection against contamination by dusts, in accordance with the invention;

FIGS. 2, 3 and 4 represent different phases of the operation of withdrawal of the observation apparatus from its mounting in the wall of the active chamber in which the apparatus is placed;

FIG. 5 is a longitudinal section of the part of a periscope provided with means for protection against ionizing radiations, in accordance with the invention;

FIG. 6 is a section on line VI—VI of FIG. 5;

FIG. 7 is a section on line VII—VII of FIG. 5;

FIG. 8 is a section on line VIII—VIII of FIG. 5;

FIG. 9 is an isometric perspective view of a member for securing the prisms; and FIG. 10 shows the manner in which the prisms, disposed inside the periscope, are secured.

For various reasons, it is sometimes necessary to withdraw the observation apparatus, shown in FIG. 1, from its chamber sleeve 2, and this gives rise to a risk of contamination, outside the chamber, by radioactive dusts deposited on the parts of the observation apparatus which were previously inside the chamber.

The first protective means which is shown in this figure for reducing these risks of contamination comprises bellows 47 contained in a sleeve 48 rigidly attached to a tube 49 capable of sliding on a tube 1, within which the observation apparatus is accommodated.

A split ring 50 secures the tube 49 rigidly to the tube 1 when a screw 51 provided with a handle is tightened.

A lifting ring 52 is welded to the sleeve 48.

The ends of the bellows 47 are clamped between flat rings 53 and 53b; the rings 53 are attached to the bottom of the sleeve 48 by screws 54, and the other two rings 53b are secured in the same way to a movable crown 55 which can be secured to the sleeve 48 by bolts 56.

When the observation apparatus is in operating or observation position, as shown in FIG. 1, the bellows 47 is contracted inside the sleeve 48, the crown 55 being gripped between the edge of the chamber sleeve 2, which is outside the chamber, and a shoulder 57 on the tube 49.

As shown in FIGS. 2, 3 and 4, the following operations are performed in order to withdraw the apparatus from its mounting in the chamber sleeve 2:

A lifting hook, not shown in the drawings, is introduced into the ring 52 (FIG. 2).

The front part of the observation apparatus is covered with a mask 58 provided with a handle 59.

The tube 49 is released by unscrewing the screw 51.

A pulling force in the direction of the arrow H (FIG. 3) is exerted on the handle 59, and this force removes the portion of the observation apparatus which is surrounded by the bellows from its mounting. At this moment, the lifting ring 52 is so located as to be directly above the center of gravity of the apparatus.

The bolts 56 of the crown 55 are then unbolted (FIG. 4) and the pulling force on the handle 59 is continued, whereby the remainder of the apparatus comes right out of the chamber sleeve 2. The bellows 47 comes out of the sleeve 48, guided by the crown 55 held in place by the operator, in such a manner as to surround the end of the tube 1, which is liable to be contaminated through having been inside the radioactive chamber.

A conventional removable sealing cap 61 is placed in position on the crown 55 by any suitable means when the crown is level with the end of the tube 1.

Protection against the contaminated parts of the apparatus is thus achieved, when the apparatus is withdrawn, by the use of these particularly simple first auxiliary protective means. Of course, the protection of the chamber sleeve 2 is reestablished by means of ordinary screens (not shown) which are provided for covering the mouth of chamber sleeve 2.

Protection against nuclear radiation when the observation apparatus is in operating position is ensured in the following manner:

The optical apparatus proper and the second means for protection against nuclear radiation are contained in a tube 1 (FIG. 5) made of steel, which, if necessary, is rendered resistant to corrosion. This tube is axially slidable in the chamber sleeve 2 which passes through the protective wall 2a of the chamber to which the sleeve 2 is fixed.

A ring 3, of which one end is chamfered, is fixed to the tube 1. When this ring abuts against a conical construction 4 of the chamber sleeve 2, the apparatus is in correct observation position.

The system of protection against ionizing radiation comprises three screens 5, 6 and 7. The screens 5 (FIG. 6) and 7 (FIG. 8) consist of lead cylinders which are contained in steel jackets 9 and through which two channels pass. One of these channels, i.e., channel 10, is provided with a lining 11, through which a rod 12 can pass, if required. This rod is used to control the position of the observation prism situated in front of the objective of the periscope. (This part of the apparatus is not shown in the drawings.) The other channels, 13A in the case of screen 5, and 13B in the case of screen 7, are provided with a lining 14. These other channels are provided for the passage of light rays diagrammatically illustrated by a thick dot-dash line 15 in FIGS. 1, 5 and 10.

The screen 6, situated between the screens 5 and 7, comprises an approximately semi-cylindrical member made of lead (FIG. 7) supported on two rods 17 threaded at their ends and shown only in FIG. 7 for greater clarity. These rods are screwed on to flanks 18A and 18B, separating, respectively, the screen 5 and the screen 7 from the screen 6 (FIG. 5).

A rod 19 is provided with the shoulder 20, to stop direct radiation proceeding from the radioactive chamber, and passes through the semi-cylindrical member 6. The ends of this rod extend into recesses 21 in the flanks 18A and 18B and keep the semi-cylindrical member 6 in place after screws 22 have been tightened. This member 6 leaves a channel 23, for the passage of light rays, between the tube 1 and the inner edge of member 6, as shown in FIG. 7.

The flanks 18A and 18B (the latter being the only one of these two flanks shown in FIG. 9) are each in the form of a metal cylinder in which two apertures, 24A and 24B, rsepectively, are made. The axes of these two apertures are parallel to that of the observation apparatus and permit the passage of light rays, and a recess 25 is provided to accommodate, respectively, a prism 26A, or 26B, as shown in FIG. 10.

The prism 26B is held against the opening 24B, inside the recess 25, by a standard system comprising a holder 27 secured by screws 28 on a piece (not shown) fixed to the flank 18B, an L-shaped member 29 secured on the piece fixed to flank 18B by screws 30, a bar 31 secured on the same piece by a nut 38, and an eccentric-headed screw 33, thereby controlling the position of the prism 26B.

The screens 5, 6 and 7 form a labyrinth or baffle system whereby radiation due to nuclear disintegrations occurring in the chamber cannot be directly propagated from the objective to the eyepiece of the periscope.

On the other hand, light rays proceeding from an objective situated in the direction F (FIG. 5) are received, for instance, by an optical system of usual type comprising two optical systems 34A and 34B, situated in the channels 13A and 13B, respectively, and then travel to the eyepiece situated in the direction G.

Between the two optical systems 34A and 34B are disposed the two prisms 26A and 26B, which cause the light rays to pass through the respective openings 24A and 24B of the flanks 18A and 18B. In any case in which the objective would give inverted images, more particularly if the apparatus is a periscope of the azimuth type, these images be re-erected by a standard system, such as a well-known Dove prism 35 mounted in the channel 23.

A diaphragm 38, situated in the same channel 23, constricts the diameter of the light beam transmitted and, therefore, the effective diameter of the lenses. The two channels 13A and 13B, on the one hand, and the channel 23, on the other hand, can thus be made with a small diameter, so that they can be accommodate in the tube 1 without any need to make the latter too large to comply with practical requirements.

The optical unit with protective means is secured in the tube 1 in the following manner:

The protective screen 5 is secured to the tube 1 by screws (not shown).

The flanks 18A and 18B are secured by means of lugs 41A and 41B, each engaging in a cavity 42A and 42B, respectively, in the tube 1. These lugs are screwed to the flanks 18A and 18B by means of screws 43A and 43B.

The Dove prism assembly is secured between the two flanks 18A and 18B by screws 44 (FIG. 7).

The screen 7, bearing against the flank 18B, is secured by a strut 45 (FIG. 1), which is itself held by a threaded crown 46 screwed into the tube 1.

What I claim is:

1. Optical apparatus for observing the interior of sealed chambers containing radioactive material, comprising: means defining an opening in one wall of said chamber; a tube having its inner end portion slidably mounted within said opening and serving as a housing for a series of radiation screens having non-aligned openings; prism means mounted in optical alignment in said tube for diverting light rays from one end of said tube to the other through said last-mentioned openings; bellows means having one end surrounding and sealed to the outer end portion of said tube and adapted to expand to progressively encompass the inner end portion of said tube as said remainder is withdrawn outwardly through said opening; and sealing means for closing the inner end of said inner end portion of said bellows after said tube is withdrawn into said bellows.

2. The apparatus of claim 1, wherein said means defining an opening comprises a sleeve sealed in an opening in said wall and projecting outwardly therefrom.

3. The apparatus of claim 1 including means closing the outer end of said tube and having a handle thereon for withdrawing said tube.

4. Optical apparatus for observing the interior of sealed chambers containing radioactive elements, comprising a cylindrical envelope mounted in an opening in the chamber, optical apparatus slideably mounted in said cylindrical envelope, said envelope being surrounded by a bellows sealingly connected at one end to a part of said optical apparatus outside the chamber, said bellows being adapted to expand as the optical apparatus is withdrawn from the chamber and thus surround the portion of the apparatus which was previously located in the interior of said chamber, the other end of the bellows being adapted to be closed by sealing means, said apparatus further comprising at least two cylindrical screens of radiation-absorbing material, each including a longitudinal opening having an axis parallel to the axis of the apparatus, and said opening in each screen being arranged in alignment with a solid portion of the adjacent screen, and a prism having two inverted total reflections being interposed between two successive screens so as to direct the light rays isuing from the opening in one screen towards the opening in the following screen.

5. Apparatus as claimed in claim 4 wherein said sealed bellows is mounted in a sleeve that can slide, with tight sealing provided along the part of said optical apparatus outside the chamber.

References Cited in the file of this patent

UNITED STATES PATENTS

| 723,303 | Powell | Mar. 24, 1903 |
| 784,487 | Goerz et al. | Mar. 7, 1905 |
| 2,460,461 | Larkin | Feb. 1, 1949 |
| 2,709,222 | Lawrence | May 24, 1955 |

FOREIGN PATENTS

| 229,456 | Germany | Dec. 21, 1910 |